United States Patent [19]

Claar et al.

[11] Patent Number: 5,019,539
[45] Date of Patent: May 28, 1991

[54] PROCESS FOR PREPARING SELF-SUPPORTING BODIES HAVING CONTROLLED POROSITY AND GRADED PROPERTIES AND PRODUCTS PRODUCED THEREBY

[75] Inventors: Terry D. Claar; William B. Johnson, both of Newark, Del.

[73] Assignee: Lanxide Technology Company, LP, Newark, Del.

[21] Appl. No.: 296,961

[22] Filed: Jan. 13, 1989

[51] Int. Cl.$^5$ ............................................. C04B 35/10
[52] U.S. Cl. ...................................... 501/87; 501/96; 501/127; 501/128; 501/134; 75/235; 264/65; 264/60; 423/625; 423/412
[58] Field of Search ................. 501/96, 102, 100, 93, 501/87; 75/238; 419/2, 5, 12; 420/129, 590

[56] References Cited

U.S. PATENT DOCUMENTS

| | | |
|---|---|---|
| 3,758,662 | 9/1973 | Tobin ................................. 264/332 |
| 4,217,141 | 8/1980 | Schrittwieser ......................... 75/244 |
| 4,471,059 | 9/1984 | Yoshino et al. ........................ 501/96 |
| 4,595,545 | 6/1986 | Sane ....................................... 264/65 |
| 4,605,440 | 8/1986 | Halverson et al. .................... 75/238 |
| 4,692,418 | 9/1987 | Boecker et al. ....................... 501/90 |
| 4,702,770 | 10/1987 | Pyzik ...................................... 75/236 |
| 4,713,360 | 12/1987 | Newkirk et al. ....................... 501/87 |
| 4,718,941 | 1/1988 | Halverson ............................. 75/236 |
| 4,777,014 | 10/1988 | Newkirk et al. ....................... 419/12 |
| 4,800,065 | 1/1989 | Christodoulou et al. ........... 420/129 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1977 | United Kingdom . |

Primary Examiner—William R. Dixon, Jr.
Assistant Examiner—C. Melissa Bonner
Attorney, Agent, or Firm—Mark G. Mortenson; William E. McShane; Michael K. Boyer

[57] ABSTRACT

This invention relates generally to a novel method of preparing self-supporting bodies and to the novel products made thereby. In its more specific aspects, this invention relates to a method of producing self-supporting bodies comprising one or more boron-containing compounds, e.g., a boride or a boride and a carbide, by reacting, in one embodiment, a powdered parent metal, in molten form, with a bed or mass comprising a boron carbide material and, optionally, one or more inert fillers, to form the body. In another embodiment, both of a powdered parent metal and a body or pool of molten parent metal are induced to react with a bed or mass comprising a boron carbide material, and, optionally, one or more inert fillers.

15 Claims, 2 Drawing Sheets

PROCESS FOR PREPARING SELF-SUPPORTING BODIES HAVING CONTROLLED POROSITY AND GRADED PROPERTIES AND PRODUCTS PRODUCED THEREBY

FIELD OF THE INVENTION

This invention relates generally to a novel method of preparing self-supporting bodies and to the novel products made thereby. In its more specific aspects, this invention relates to a method of producing self-supporting bodies comprising one or more boron-containing compounds, e.g., a boride or a boride and a carbide, by reacting, in one embodiment, a powdered parent metal, in molten form, with a bed or mass comprising a boron carbide material and, optionally, one or more inert fillers, to form the body. In another embodiment, both of a powdered parent metal and a body or pool of molten parent metal are induced to react with a bed or mass comprising a boron carbide material, and, optionally, one or more inert fillers.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristics tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite. There is further no employment of boron carbide in this process.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlBl_2$, but rather $TiB_{12}$ is formed demonstrating the fact that the aluminum is not the metal precursor to the boride. There is further no suggestion of using boron carbide as a precursor material in the process.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al, B-Al; $B_4C$-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENT APPLICATIONS

Many of the above-discussed problems associated with the production of boride-containing materials have been addressed in co-pending. U.S. Patent application Ser. No. 296,771 filed Jan. 13, 1989, which issued on U.S. Pat. No. 4,885,130, which is a continuation-in-part of Ser. No. 137,044 filed Dec. 23, 1987, that in turn is a continuation-in-part of Ser. No. 073,533, (herein after application '533) filed in the names of Danny R. White, Michael K. Aghajanian and T. Dennis Claar, on July 15, 1987, and entitled "Process for Preparing Self-Supporting Bodies and Products Made Thereby".

The following definitions were used in Application '533 and shall apply to the instant application as well.

"Parent metal" refers to that metal (e.g., zirconium) which is the precursor for the polycrystalline oxidation reaction product, that is, the metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boron compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of Application 533, self-supporting ceramic bodies are produced by utilizing a parent metal infiltration and reaction process (i.e., reactive infiltration) in the presence of a boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boron carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boron compound under the temperature conditions of the process). Typically, a parent metal carbide is also produced, and in certain cases, a parent metal boron carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Application 533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Copending U.S. Patent application Ser. No. 137,044 (hereinafter referred to as "Application", '044"), filed in the names of Terry Dennis Claar, Steven Michael Mason, Kevin Peter Pochopien and Danny Ray White, on December 23, 1987, and entitled "Process for Preparing Self-Supporting Bodies and Products Made Thereby", is a Continuation-in-Part Application of '533. Application '044 discloses that in some cases it may be desirable to add a carbon donor material (i.e., a carbon-containing compound) to the bed or mass of boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produced due to the addition of a carbon donor material in the mass of boron carbide).

Application '044 also discloses the use of a graphite mold which contains an appropriate number of through-holes having a particular size, shape and location which function as a venting means to permit the removal of, for example, any gas which may be trapped in the preform or filler material as the parent metal reactive infiltration front infiltrates the preform.

In another related application, specifically, Copending U.S. patent application Ser. No. 137,382 now U.S. Pat. No. 4,822,782 (hereinafter referred to as "Application '382"), filed in the names of Terry Dennis Claar and Gerhard Hans Schiroky, on Dec. 23, 1987, and entitled "A Method of Modifying Ceramic Composite Bodies by a Carburization Process and Articles Made Thereby", additional modification techniques are disclosed. Specifically, Application '382 discloses that a ceramic composite body made in according with the teachings of Application '533 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Application '382 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post-carburization treatment to result in from about 0 to about 2 volume percent, typically about ½ to about 2 volume percent, of parent metal remaining in the composite body.

The disclosures of each of the above-discussed Commonly Owned U.S. applications are herein expressly incorporated by reference.

SUMMARY OF THE INVENTION

In accordance with the present invention, self-supporting ceramic bodies are produced with a controlled porosity and/or graded properties. Such control is achieved by utilizing a powdered parent metal in combination with a material comprising boron carbide. In one preferred embodiment, both a powdered parent metal and a body or pool of molten parent metal are used together.

Stated more specifically, a powdered parent metal is admixed in a desirable amount with a material comprising boron carbide and, optionally, a filler material. The mixture is heated to a temperature above the melting point of the parent metal causing the parent metal to react with the boron carbide material to form a parent metal carbide and a parent metal boride phase. Parent metals such as zirconium, titanium, hafnium, etc. can be formed into powders and mixed in varying amounts with a boron carbide material. The powdered parent metal, upon reacting with the boron carbide, will form porosity which, may correspond in relative size to the powdered parent metal particles. Specifically, if relatively large powdered parent metal particles were admixed with a boron carbide material, a larger pore size would be achieved in relation to relatively smaller parent metal particles. Moreover, the relative volume fraction of particulate parent metal to boron carbide may also influence the amount of porosity (i.e., as the amount of particulate parent metal increases, the amount of porosity generated in a formed body may also increase).

By combining a powdered parent metal with a boron carbide material, it is possible to control a formed body such that it could be dense at one surface thereof and relatively porous at another. Such effect could be achieved by mixing relatively large particles of parent metal with boron carbide near the surface of the body which was desired to be relatively porous, and mixing relatively small particles of powdered parent metal with boron carbide at a portion of the body which was desired to be relatively dense.

In another preferred embodiment, powdered parent metal may be admixed with boron carbide in only a portion of the boron carbide material. Thus, the amount of powdered parent metal provided may be insufficient to react to completion the boron carbide material. Accordingly, in some cases it may be necessary to provide in addition to the powdered parent metal, a molten body or pool of parent metal which also reacts with the boron carbide material. Such reaction would be a reactive infiltration, as discussed above in, for example, Application '533. Moreover, such reactive infiltration preferably would occur from a direction in a boron carbide material which was substantially oppositely located from the powdered parent metal. Specifically, if a preform of boron carbide was formed into a plate-like shape and only one side of the plate included particulate parent metal, then reactive infiltration may be induced to occur from the side of the plate which was opposite to (e.g., furtherest from) the location of the particular parent metal.

Bodies made according to the process of the invention which include a controlled amount of porosity, could be used for such applications as high temperature filters (especially those filters exposed to corrosive environments) as well as in biomedical applications. Specifically, by grading the porosity in a self-supporting body made according to the invention (i.e., by changing the porosity in one portion of a body relative to another), bone growth could penetrate the body and ligaments and/or muscles could attach to the body. Still further, the thermal and/or mechanical properties of the body can be controlled by controlling the amount of porosity, as well as the specific location of the porosity. For example, porosity could be designed to be in only a central portion of the body, while outer portions of the body remained relatively dense.

Accordingly, bodies made according to the present invention can be applied in a virtually unlimited number of applications including everything from heavy industrial applications to biomedical applications.

DETAILED DESCRIPTION OF INVENTION AND PREFERRED EMBODIMENTS

Figure 1:
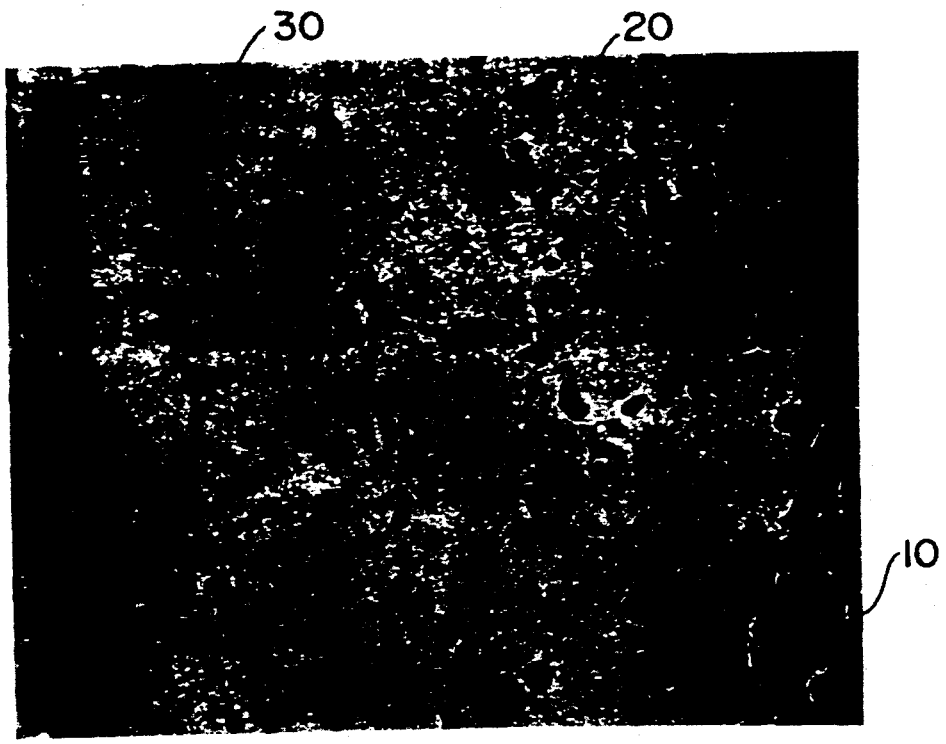
FIG. 1 is a photomicrograph at 50X magnification of a section of a ceramic composite formed by the method described in Example 1.

In accordance with the present invention, self-supporting ceramic bodies are produced with a controlled porosity (e.g., highly porous, dense, etc.) and/or graded properties. Such control is achieved by utilizing a powdered parent metal in combination with a material comprising boron carbide. In addition, a filler material may be admixed with the material comprising boron carbide. Further, in a preferred embodiment, both a powdered parent metal and a body or pool or parent metal may be used in combination.

Stated more specifically, a powdered parent metal is admixed in a desirable amount with a material comprising boron carbide and, optionally, a filler material. The mixture is heated to a temperature above the melting point of the parent metal causing the parent metal to react with the boron carbide material to form a parent metal carbide and a parent metal boride phase. Parent metals such as zirconium, titanium, hafnium, etc. can be formed into powders and can be mixed in varying amounts with a boron carbide material. The powdered parent metal, upon reacting with the boron carbide, will form pores which may correspond in relative size to the powdered parent metal particles which had previously occupied the space in the mixture. Specifically, if relatively large powdered parent metal particles were admixed with a boron carbide material, a larger pore size would be achieved in relation to relatively smaller parent metal particles. Moreover, the relative volume fraction of particulate parent metal to boron carbide may also influence the amount of porosity (i.e., as the amount of particulate parent metal increases, the amount of porosity generated in a formed body may also increase). Further, the relative packing of the mixture of parent metal and boron carbide may effect the porosity of the formed body. Specifically, when a pressure is applied to a mixture of boron carbide and parent metal which results in a closer packing of the particles, the porosity of the resultant body may contain a relatively lesser amount of porosity following infiltration as compared to bodies formed when no packing of the particles occurred.

By combining a powdered parent metal with a boron carbide material, it is possible to control a formed body such that it could be dense at one surface thereof and relatively porous at another surface or in another portion of the body. Such effect could be achieved by mixing relatively large particles of parent metal with boron carbide near a surface of the body which was desired to be relatively porous, and mixing relatively small particles of powdered parent metal with boron carbide at a portion of the body which was desired to be relatively dense. Moreover, by packing the particles in the mixture of parent metal and boron carbide in one portion of the mixture more densely relative to another portion of the mixture, it is possible to control the relative porosity of the body in one area of the body as compared with another area of the body. Further, a formed body could be controlled such that is could be dense at one surface and relatively porous at another by varying the amount of filler material of the same size and/or by varying the relative shape of the filler material particles in one part of the body as opposed to another part of the body.

In another preferred embodiment, two or more parent metals may be admixed in a desirable amount with a material comprising boron carbide and, optionally, a filler material. Parent metals such as zirconium, titanium, hafnium, etc. can be formed into powders and admixed in combinations of two or more (e.g., zirconium and titanium) in varying amounts with the boron carbide material. Moreover, the relative sizes of the admixed parent metals may be varied to influence the amount of porosity and/or the properties of the formed body. Still further, differing parent metals could be placed in different areas of the boron carbide material. Specifically, a surface or portion of a boron carbide material may contain zirconium powder, while a differing surface or portion of the boron carbide material may contain titanium powder.

In a further preferred embodiment, powdered parent metal may be admixed with boron carbide in only a portion of the boron carbide material. Thus, the amount of powdered parent metal provided may be insufficient to react to completion the boron carbide material. Accordingly, in some cases it may be necessary to provide in addition to the powdered parent metal, a molten body or pool or parent metal which also reacts with the boron carbide material. Such reaction would be a reactive infiltration process, as discussed in, for example, Application '533. Moreover, such reactive infiltration preferably would occur from a direction in a boron carbide material which was substantially oppositely located from the powdered parent metal. Specifically, if a preform of boron carbide was formed into a plate-like shape and only one side of the plate included particulate parent metal, then reactive infiltration may be induced to occur from the side of the plate which was opposite (e.g., furthest from) the location of the particulate parent metal.

In a further embodiment, powdered parent metal (i.e., a single parent metal or a combination of two or more parent metals) may be admixed with boron carbide in only a portion of the boron carbide material, thereby providing insufficient parent metal to react to completion with the boron carbide material. Accordingly, a molten body or pool of a parent metal having a different composition (e.g., a parent metal different from the parent metal in the boron carbide or a combination of two or more parent metals) may be provided in addition to the powdered parent metals in the boron carbide material.

In a still further embodiment, the particle size of the boron carbide material may be varied to control the porosity of the formed body. Specifically, by varying the particle size of the boron carbide material, either homogeneously throughout the body or in a graded distribution, the porosity of the formed body may be affected. Moreover, by varying the particle size of any filler material which, optionally, may be added to the boron carbide material, the porosity of the formed body may be affected.

EXAMPLE 1

A homogeneous mixture of about 10 grams of $B_4C$ (320 grit from ESK) and about 70 grams of zirconium powder ($-325$ mesh from Consolidated Astronautics) was mixed by manually shaking the powders together in a Nalgene container. Approximately 20 grams of the powdered mixture was placed into a 1 inch diameter graphite crucible (ATJ grade graphite crucible from Graphite Die Mold Co.) and pressed with a 1 inch die to a pressure of about 5000 psi. After pressing, the thickness of the $B_4C$/zirconium preform was about 0.9 inches.

The assembly, comprising the graphite crucible and its contents, was placed into a vacuum furnace. The furnace was evacuated and backfilled with argon flowing at a rate of about 2 liters/minute, resulting in a chamber pressure of about 2 psi. The evacuation step was repeated and the system was heated under argon from room temperature to about 200° C. in about 2 hours, held for about 2 hours, heated from about 200° C. to about 350° C. at about 20° C. per hour, then heated from about 350° C. to about 450° C. in about 2 hours and from about 450° C. to about 1750° C. in about 4 hours. The temperature was maintained at about 1750° C. for about one hour, then heated from about 1750° C. to about 1900° C. in about one hour and held for about 2 hours at about 1900° C. The system was then cooled to room temperature in about 8 hours.

Figure 2:
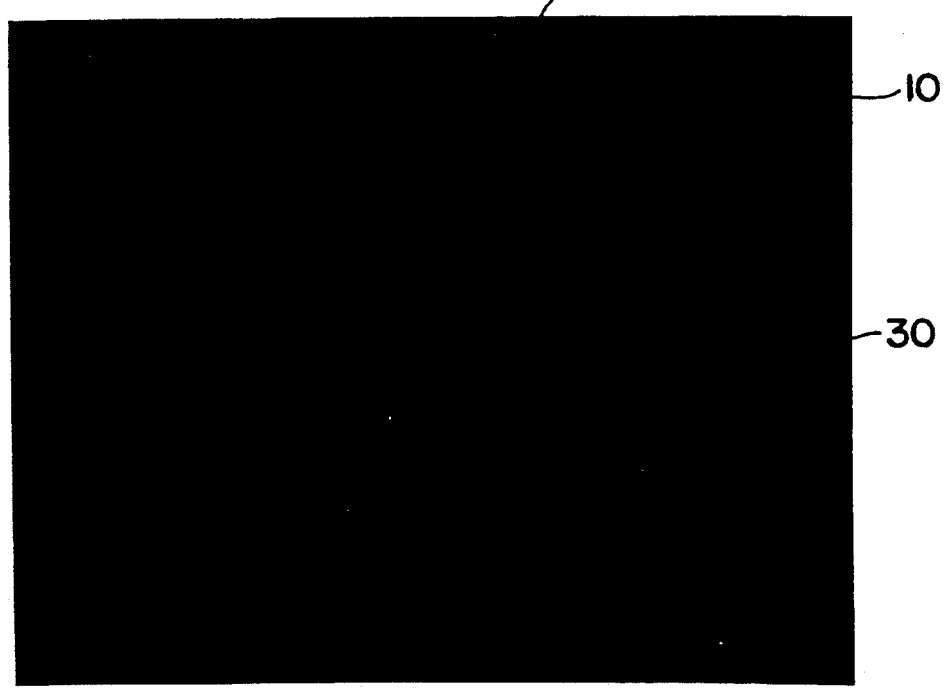
FIG. 2 is a photomicrograph at 400X magnification of a section of a ceramic composite formed by the method described in Example 1.

Upon removal from the furnace, it was observed that the zirconium had reactively infiltrated the $B_4C$ powder to form a composite body having porosity, as shown in FIGS. 1 and 2.

Figure 3:
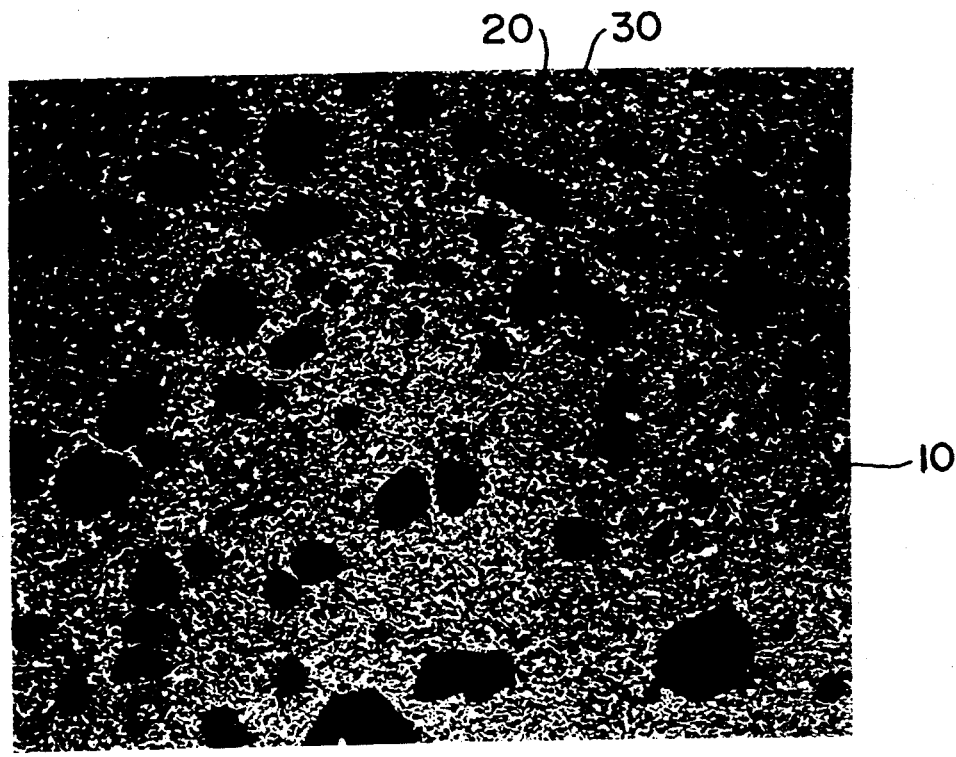
FIG. 3 is a photomicrograph at 50X magnification of a section of a ceramic composite formed by the method of Example 2.
Figure 4:
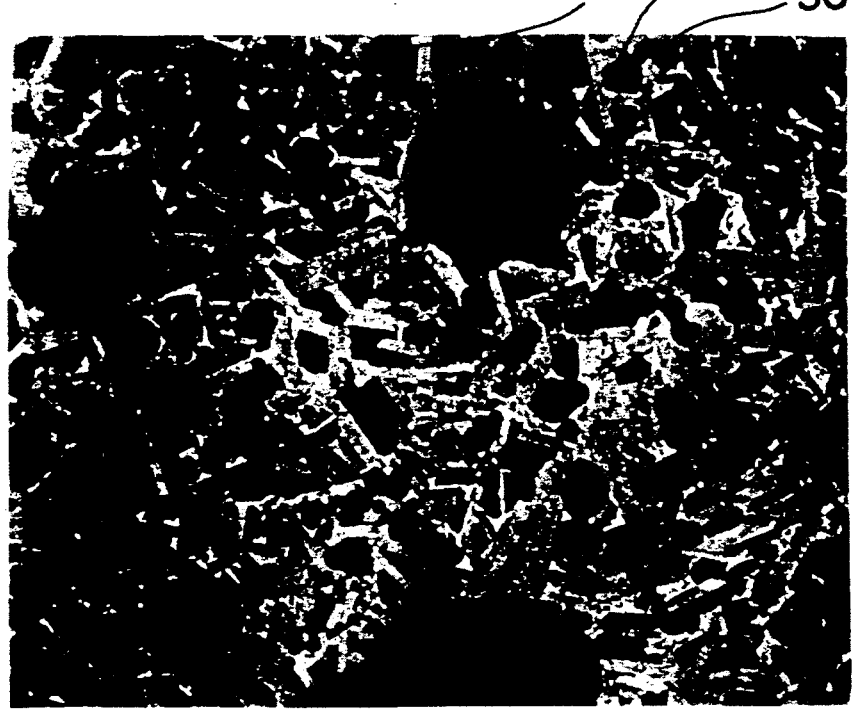
FIG. 4 is a photomicrograph at 400X magnification of a section of a ceramic composite formed by the method of Example 2.

FIGS. 3 and 4 are microphotographs respectively at 50X and 400X magnification. Specifically, phases (10), (20), and (30) correspond to those discussed above in Example 1. However, FIGS. 3 and 4 demonstrate that the particle diameter of the parent metal is related to the characteristics of the porosity which is formed.

EXAMPLE 2

A homogeneous mixture of about 10 grams of $B_4C$ (500 grit from ESK) and about 70 grams of zirconium powder ($-50$ mesh from Atlantic Equipment Engineering) was mixed by manually shaking the powders together in a Nalgene container. Approximately 19.8 grams of the powdered mixture was placed into a 1 inch diameter graphite crucible (ATJ grade graphite crucible from Graphite Die Mold Co.) and pressed with a 1 inch die to a pressure of about 325 psi. After pressing, the thickness of the $B_4C$/zirconium preform was about 0.5 inches.

The assembly, comprising the graphite crucible and its contents, was placed into a vacuum furnace. The furnace was evacuated and backfilled with argon flowing at a rate of about 2 liters/minute, resulting in a chamber pressure of about 2 psi. The evacuation step was repeated, and the system was heated under argon from room temperature to about 200° C. in about 2 hours, held for about 2 hours, heated from about 200 C. to about 350 C. at about 20° C. per hour, then heated from about 350 C. to about 450 C. in about 2 hours and from about 450° C. to about 1750° C. in about 4 hours. The temperature was maintained at about 1750 C. for about one hour, then heated from about 1750 C. to about 1900° C. in about one hour and held for about 2 hours at about 1900° C. The system was then cooled to room temperature in about 8 hours.

Upon removal from the furnace, it was observed that the zirconium had reactively infiltrated the $B_4C$ powder to form a composite body having porosity, as shown in FIGS. 3 and 4.

Specifically, FIGS. 1 and 2 are photomicrographs respectively at 50X and 400X magnification of a section of a ceramic composite body formed according to Example 1. Moreover, the darker generally circular regions (10) comprise porosity, the platelets (20) comprise a phase comprising a boron containing compound (e.g., $ZrB_2$) and the remaining phase (30) typically comprise a ZrC containing phase (e.g., ZrC, $B_4C$, and residual metal).

EXAMPLE 3

A homogeneous mixture of about 9 grams of $B_4C$ (1000 grit from ESK) and about 630 grams of zirconium powder ($-50$ mesh, from Atlantic Equipment Engineering, known as Zr 307) was prepared by manually shaking the powders in a Nalgene container. The mixture was loaded into a 2 inch by 2 inch by 2 inch graphite crucible (ATJ grade graphite crucible from Graphite Die Mold Co.) by tapping the powder manually to a thickness of about 0.35 inches.

The assembly, comprising the graphite crucible and the contents, was placed in a vacuum furnace. The furnace was evacuated and backfilled with argon flowing at a rate of about 2 liters/minute, resulting in a chamber pressure of about 2 psi. The evacuation step was repeated, and the system was heated under vacuum to about 1000 C. At a temperature of about 1000° C., argon was flowed into the furnace at a rate of about 2 liters/minute. The system was then ramped to about 1900° C., the time required to heat the system from room temperature to about 1900° C. being about 10 hours. The temperature was held at about 1900° C. for about 2 hours, then the furnace was ramped down to room temperature in about 12 hours.

Upon removal from the furnace, it was observed that the zirconium had reactively infiltrated the $B_4C$ powder to form a composite body comprising zirconium boride and zirconium carbide and exhibiting porosity.

What is claimed is:

1. A method of producing a self-supporting body comprising:
   mixing a particulate parent metal in at least a portion of a boron carbide material and heating said mixture to a temperature sufficient to cause a reaction between said particulate parent metal and said boron carbide material, said reaction occurring in a substantially inert atmosphere, to form at least one boron-containing compound and a parent metal carbon-containing compound; and continuing said reaction for a time sufficient to produce a self-supporting body comprising a parent metal boron-containing compound and a parent metal carbon-containing compound, said self-supporting body exhibiting a graded porosity.

2. A method of producing a self-supporting body comprising:

mixing a particulate parent metal with a boron carbide material; and contacting at least a portion of said mixture comprising parent metal and boron carbide with a molten body of parent metal to result in a reaction of the body of molten parent metal with the boron carbide and a reaction of the particulate parent metal with the boron carbide, thereby forming at least one boron-containing compound, and resulting in a self-supporting body possessing a graded porosity.

3. A method of producing a self-supporting body having graded properties comprising:

mixing a particulate parent metal with a boron carbide material, said particulate parent metal comprising at least two different particle sizes and being located in different portions of the mixture of boron carbide and particulate parent metal such that when said particulate parent metal is heated in a substantially inert atmosphere to a temperature to permit reaction with the mass comprising boron carbide, a self-supporting body is produced which has graded properties.

4. A method according to claim 1, wherein said particulate parent metal comprises at least one metal selected from the group consisting of aluminum, zirconium, hafnium and titanium.

5. A method according to claim 2, wherein said particulate parent metal comprises at least one metal selected from the group consisting of aluminum, zirconium, hafnium and titanium.

6. A method according to claim 3, wherein said particulate parent metal comprises at least one metal selected from the group consisting of aluminum, zirconium, hafnium and titanium.

7. The method of claim 3, further comprising controlling the distribution of said particulate parent metal to provide graded porosity.

8. The method of claim 1, wherein said particulate parent metal is provided in a limited quantity, such that said parent metal is sufficient to react substantially completely said boron carbide material.

9. The method of claim 2, wherein said particulate parent metal is provided in a limited quantity, such that said parent metal is sufficient to react substantially completely said boron carbide material.

10. The method of claim 1, wherein said porosity is sufficient to permit at least one member of the group consisting of bone, ligaments and mucles to attach to at least a portion of said self-supporting body.

11. The method of claim 2, wherein said porosity is sufficient to permit at least one member of the group consisting of bone, ligaments and muscles to attach to at least a portion of said self-supporting body.

12. The method of claim 7, wherein said porosity is sufficient to permit at least one member of the group consisting of bone, ligaments and muscles to attach to at least a portion of said self-supporting body.

13. The method of claim 1, wherein said porosity is located at least in a central region of said self-supporting body.

14. The method of claim 2, wherein said porosity is located at least in a central region of said self-supporting body.

15. The method of claim 7, wherein said porosity is located at least in a central region of said self-supporting body.

* * * * *

UNITED STATES PATENT AND TRADEMARK OFFICE
CERTIFICATE OF CORRECTION

PATENT NO. : 5,019,539
DATED : May 28, 1991
INVENTOR(S) : Terry Dennis Claar et al.

It is certified that error appears in the above-indentified patent and that said Letters Patent is hereby corrected as shown below:

| | | |
|---|---|---|
| Column 1, | line 55: | change "characteristics" to --characteristic--. |
| Column 2, | line 35: | change "AlBl$_2$" to --AlB$_{12}$--. |
| Column 2, | line 36: | change "TiB$_{12}$" to --"TiB$_2$--. |
| Column 4, | line 18: | change "carbon containing" to --carbon-containing--. |
| Column 5, | line 16: | change "4,822,782" to --4,915,736--. |
| Column 5, | line 23: | change "according" to --accordance--. |
| Column 9, | line 50: | change "B4C" to --B$_4$C--. |
| Column 9, | lines 53-58: | change "FIGS. 3 and 4 are micrographs...which is formed." to --Specifically, FIGS. 1 and 2 are photomicrographs respectively at 50X and 400X magnification of a section of a ceramic composite body formed according to Example 1. Moreover, the darker generally circular regions (10) comprise porosity, the platelets (20) comprise a phase comprising a boron-containing compound (e.g., ZrB$_2$) and the remaining phase (3) typically comprise a ZrC containing phase (e.g., ZrC, B$_4$C, and residual metal).--. |

UNITED STATES PATENT AND TRADEMARK OFFICE
CERTIFICATE OF CORRECTION

PATENT NO. : 5,019,539
DATED : May 28, 1991
INVENTOR(S) : Terry Dennis Claar et al.

It is certified that error appears in the above-indentified patent and that said Letters Patent is hereby corrected as shown below:

Column 10, lines 24-32: change "Specifically, FIGS 1 and 2 are...and residual)." to --Figs. 3 and 4 are microphotographs respectively at 50X and 400X magnification. Specifically, phases (10), (20), and (30) correspond to those discussed above in Example 1. However, FIGS. 3 and 4 demonstrate that the particle diameter of the parent metal is related to the characteristics of the porosity which is formed.--.

Column 10, line 50: change "1000 C" to --1000°C--.

Signed and Sealed this

Eighteenth Day of June, 1996

Attest:

BRUCE LEHMAN

*Attesting Officer*  *Commissioner of Patents and Trademarks*